(12) United States Patent
Hanawa et al.

(10) Patent No.: US 9,672,857 B2
(45) Date of Patent: *Jun. 6, 2017

(54) LUBRICANT FOR MAGNETIC RECORDING MEDIUM, MAGNETIC RECORDING MEDIUM, MANUFACTURING METHOD OF MAGNETIC RECORDING MEDIUM, AND MAGNETIC RECORDING AND REPRODUCING DEVICE

(71) Applicant: SHOWA DENKO K.K., Tokyo (JP)

(72) Inventors: Kenzo Hanawa, Ichihara (JP); Tsubasa Okada, Kawasaki (JP)

(73) Assignee: SHOWA DENKO K.K., Tokyo (JP)

( * ) Notice: Subject to any disclaimer, the term of this patent is extended or adjusted under 35 U.S.C. 154(b) by 205 days.

This patent is subject to a terminal disclaimer.

(21) Appl. No.: 14/558,368

(22) Filed: Dec. 2, 2014

(65) Prior Publication Data

US 2015/0162044 A1 Jun. 11, 2015

(30) Foreign Application Priority Data

Dec. 5, 2013 (JP) ................................. 2013-252348

(51) Int. Cl.
*G11B 5/66* (2006.01)
*G11B 5/725* (2006.01)
(Continued)

(52) U.S. Cl.
CPC ........... *G11B 5/725* (2013.01); *C10M 103/02* (2013.01); *G11B 5/8408* (2013.01);
(Continued)

(58) Field of Classification Search
CPC ....... G11B 5/72; G11B 5/725; C07C 2104/00; C10M 2213/06; C10M 2213/0606;
(Continued)

(56) References Cited

U.S. PATENT DOCUMENTS

| | | | | |
|---|---|---|---|---|
| 5,382,718 A | * | 1/1995 | Bekiarian | C07C 23/46 558/388 |
| 2006/0073370 A1 | * | 4/2006 | Krusic | B82Y 30/00 429/483 |
| 2013/0288080 A1 | * | 10/2013 | Yan | C07F 9/65815 428/833 |

FOREIGN PATENT DOCUMENTS

| | | |
|---|---|---|
| JP | 62-066417 A | 3/1987 |
| JP | 06-044556 A | 2/1994 |

(Continued)

OTHER PUBLICATIONS

Japanese Office Action of JP 2013-252348 dated Apr. 1, 2014.
(Continued)

*Primary Examiner* — Holly Rickman
(74) *Attorney, Agent, or Firm* — Sughrue Mion, PLLC

(57) ABSTRACT

A lubricant for a magnetic recording medium of the present invention includes an organic compound having a fullerene skeleton, and the organic compound having the fullerene skeleton is expressed by the following general formula (i).

(Continued)

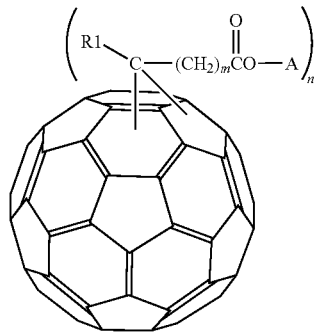

(i)

6 Claims, 1 Drawing Sheet

(51) Int. Cl.
*G11B 5/84* (2006.01)
*C10M 103/02* (2006.01)
(52) U.S. Cl.
CPC ... *C10M 2201/041* (2013.01); *C10N 2220/04* (2013.01); *C10N 2240/204* (2013.01); *C10N 2250/121* (2013.01)
(58) Field of Classification Search
CPC .............. C10M 105/50; C10M 107/38; C10N 2040/18; Y10S 977/734; Y10S 977/735
See application file for complete search history.

(56) References Cited

FOREIGN PATENT DOCUMENTS

| | | | |
|---|---|---|---|
| JP | 9-188506 | A | 7/1997 |
| JP | 09-282642 | A | 10/1997 |
| JP | 10-49855 | A | 2/1998 |
| JP | 2004-519800 | A | 7/2004 |
| JP | 2005-135565 | A | 5/2005 |
| JP | 2006-131874 | A | 5/2006 |
| JP | 2008-140445 | A | 6/2008 |
| JP | 2013-170137 | A | 9/2013 |
| WO | 0180224 | A2 | 10/2001 |

OTHER PUBLICATIONS

A Notice of Allowance dated Feb. 1, 2016 which issued during the prosecution of U.S. Appl. No. 14/559,272.
An Office Action dated Oct. 23, 2015 which issued during the prosecution of U.S. Appl. No. 14/559,272.
A Restriction Requirement dated Jul. 28, 2015 which issued during the prosecution of U.S. Appl. No. 14/559,272.
Communication dated Apr. 8, 2014, from the Japanese Patent Office in counterpart application No. 2014-005852.
Communication dated Apr. 18, 2017, mailed from the Japan Patent Office in the counterpart Japanese Application No. 2014-101816.
Communication dated Apr. 18, 2017, mailed from the Japan Patent Office in the counterpart Japanese Application No. 2014-101819.

* cited by examiner

LUBRICANT FOR MAGNETIC RECORDING MEDIUM, MAGNETIC RECORDING MEDIUM, MANUFACTURING METHOD OF MAGNETIC RECORDING MEDIUM, AND MAGNETIC RECORDING AND REPRODUCING DEVICE

BACKGROUND OF THE INVENTION

Field of the Invention

The present invention relates to a lubricant for a magnetic recording medium, a magnetic recording medium, a manufacturing method of a magnetic recording medium, and a magnetic recording and reproducing device.

Priority is claimed on Japanese Patent Application No. 2013-252348, filed Dec. 5, 2013, the content of which is incorporated herein by reference.

Description of Related Art

Currently, track density of a magnetic recording medium reaches 400 kTPI. When recording is performed with respect to both surfaces of one disk of 65 mm, the magnetic recording medium can records 500 GB. Further, recording density of a magnetic recording and reproducing device is continuously improving. In order to improve the recording density of the magnetic recording and reproducing device, it is most important to reduce a distance (that is, space loss) between a head sensor portion and a recording material of the magnetic recording medium. For this reason, protective coating of a head and medium thin, and decreasing a flying height of the head have been ongoing considerations. It is understood that a thickness of a lubricant coated on the protective layer is effective in terms of space loss, and thus an approach for coating the lubricant extremely thin has been ongoing.

In general, in the magnetic recording medium, a recording layer, a protective layer such as carbon, and a lubricant layer are formed on a substrate for a magnetic recording medium in this order. The protective layer protects information recorded on the recording layer, and increases slidability of a magnetic head. However, by only disposing the protective layer on the recording layer, durability of the magnetic recording medium is not sufficiently obtained.

For this reason, in general, the lubricant layer is formed by coating the lubricant on a front surface of the protective layer. By disposing the lubricant layer on the protective layer, it is possible to prevent the magnetic head of the magnetic recording and reproducing device from being directly in contact with the protective layer, and it is possible to considerably reduce a friction force of the magnetic head sliding on the magnetic recording medium. For this reason, durability of the magnetic recording and reproducing device is improved.

As the lubricant used in the magnetic recording medium, a perfluoropolyether-based lubricant or the like has been proposed. For example, in Japanese Unexamined Patent Application, First Publication No. S62-66417, a magnetic recording medium which is coated with a lubricant of perfluoroalkyl polyether having a structure of $HOCH_2-CF_2O-(C_2F_4O)_p-(CF_2O)_q-CH_2OH$ (p and q are integers) is disclosed.

In Japanese Unexamined Patent Application, First Publication No. H9-282642, a magnetic recording medium which is coated with a lubricant of perfluoroalkyl polyether (tetraol) having a structure of $HOCH_2CH(OH)-CH_2OCH_2CF_2O-(C_2F_4O)_p-(CF_2O)_q-CF_2CH_2OCH_2-CH(OH)CH_2OH$ (p and q are integers) is disclosed.

In Japanese Unexamined Patent Application, First Publication No. 2006-131874, a lubricant in which at least one type of spherical cage-type molecule selected from fullerene and a derivative thereof, and at least one type of fluorine-based lubricant, preferably a perfluoropolyether-based compound are mixed is disclosed.

In Japanese Unexamined Patent Application, First Publication No. 2013-170137, a fullerene derivative having a perfluoropolyether group on a terminal is disclosed.

SUMMARY OF THE INVENTION

In order to further reduce a floating distance of the magnetic head of the magnetic recording and reproducing device for improving the recording density of the magnetic recording and reproducing device, it is necessary that a thickness of the lubricant layer become thinner. However, when the thickness of the lubricant layer becomes thin, a gap is formed in the lubricant layer, and coverage of the front surface of the magnetic recording medium by the lubricant layer decreases, and thus a part of an underlayer of the lubricant layer may be exposed.

When a gap is formed in the lubricant layer, an environmental substance creating a contaminated substance invades from the gap of the lubricant layer into the underlayer of the lubricant layer, and thus the magnetic recording medium is contaminated.

More specifically, when the environmental substance creating the contaminated substance such as ionic impurities invades from the gap of the lubricant layer into the underlayer of the lubricant layer, the environmental substance invading into the underlayer of the lubricant layer aggregates ionic components in the underlayer of the lubricant layer, and creates the contaminated substance which contaminates the magnetic recording medium. The inside of a hard disk drive including the magnetic recording medium is generally in a high temperature state by driving the magnetic recording medium and by performing recording and reproducing of information with respect to the magnetic recording medium. Under a high temperature condition, the environmental substance invades considerably from the gap of the lubricant layer, the ionic components in the underlayer of the lubricant layer are heavily aggregated, and a remarkable amount of contaminated substance which contaminates the magnetic recording medium is created.

The present invention is made in consideration of the circumstances described above, and aims to provide a lubricant for a magnetic recording medium in which it is possible to cover a front surface of an underlayer with high coverage even when a thickness is thin, and it is possible to inhibit a contaminated substance from invading even in a high temperature condition. In addition, the present invention aims to provide a magnetic recording medium and a manufacturing method thereof in which by including the lubricant layer which is able to cover the front surface of the protective layer with high coverage even when the thickness is thin, aggregation of ionic components in the underlayer of the lubricant layer due to an environmental substance invading into the underlayer of the lubricant layer is prevented, and by inhibiting the contaminated substance which contaminates the magnetic recording medium from being created according to the aggregation of ions, it is possible to effectively prevent the front surface of the magnetic recording medium being contaminated, and it is possible to prevent the contaminated substance on the magnetic recording medium from being attached (transferred) to a magnetic head. The present invention aims to provide a magnetic recording and reproducing device including the magnetic recording medium.

The present inventors have conducted intensive studies in order to obtain a lubricant for a magnetic recording medium which is able to cover the front surface of a protective layer with high coverage without being in the shape of an island or a net even when the thickness is thin. As a result, it was found that by using a specific fullerene derivative, the lubricant for a magnetic recording medium which is able to cover the front surface of the underlayer with high coverage is obtained without being in the shape of an island or a net even when the thickness is thin. In particular, it was found that by using a lubricant layer including the specific fullerene derivative on the protective layer including carbon, or carbon and hydrogen, a bonding force between the lubricant layer and the protective layer greatly increases, the front surface of the protective layer is more likely to be covered with the lubricant layer, and the front surface of the protective layer is able to be covered with the lubricant layer with high coverage without being in the shape of an island or a net even when the thickness is thin.

That is, the present invention has a configuration described as below.

[1] A lubricant for a magnetic recording medium which includes an organic compound having a fullerene skeleton, in which the organic compound having the fullerene skeleton is expressed by the following general formula (i), in which A is a group in which any one hydroxyl group on a terminal of any one fluoro compound in the following general formulas (1) to (6) is not included, R1 is an organic group having 1 to 24 carbon atoms, m is an integer of 0 to 5, n is an integer of 1 to 4, R2 and R3 of the following general formulas (1) to (6) are perfluoro ether groups in the following general formulas (a) to (h), and p, q, r, s, t, u, v, w, x, y, and z of the following general formulas (a) to (h) are integers of 1 to 100.

[Chem. 1]

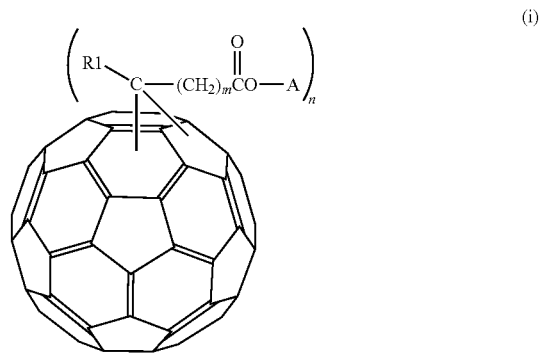

[Chem. 2]

HOCH$_2$—R2-CH$_2$OH  (1)

[Chem. 3]

HOCH$_2$CH$_2$—R2-CH$_2$CH$_2$OH  (2)

[Chem. 4]

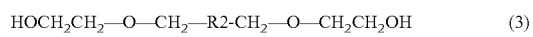

HOCH$_2$CH$_2$—O—CH$_2$—R2-CH$_2$—O—CH$_2$CH$_2$OH  (3)

[Chem. 5]

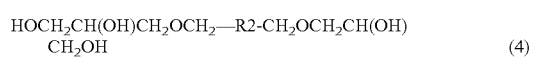

HOCH$_2$CH(OH)CH$_2$OCH$_2$—R2-CH$_2$OCH$_2$CH(OH)CH$_2$OH  (4)

[Chem. 6]

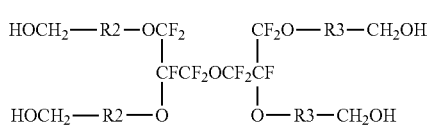

[Chem. 7]

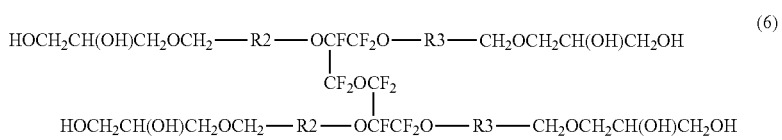

[Chem. 8]

—CF$_2$(OCF$_2$CF$_2$)$_p$— (a)

[Chem. 9]

—(CF$_2$CF$_2$O)$_q$CF$_2$— (b)

[Chem. 10]

—CF$_2$(OCF$_2$CF$_2$)$_r$—(OCF$_2$)$_s$—OCF$_2$— (c)

[Chem. 11]

—(CF$_2$O)$_t$—(CF$_2$CF$_2$O)$_u$—(CF$_2$O)$_v$—CF$_2$— (d)

[Chem. 12]

—(CF$_2$CF$_2$CF$_2$O)$_w$—CF$_2$CF$_2$— (e)

[Chem. 13]

—(CF$_2$CF(CF$_3$)O)$_x$—CF$_2$— (f)

[Chem. 14]

—CF$_2$CF$_2$(OCF$_2$CF$_2$CF$_2$)$_y$OCF$_2$CF$_2$— (g)

[Chem. 15]

—CF$_2$CF$_2$CF$_2$O(CF$_2$CF$_2$CF$_2$CF$_2$O)$_z$CF$_2$CF$_2$CF$_2$— (h)

[2] The lubricant for a magnetic recording medium according to [1], in which the organic compound in the general formula (i) is an organic compound in the following general formula (ii).

[Chem. 16]

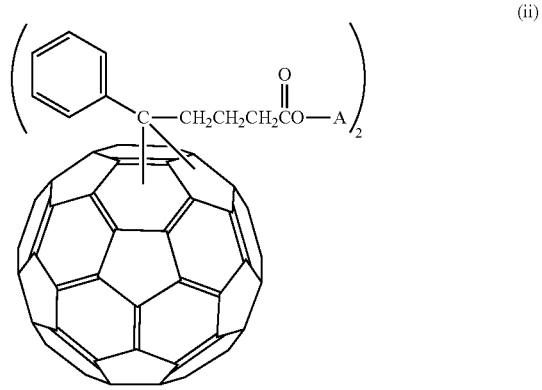

(ii)

[3] The lubricant for a magnetic recording medium according to [1] or [2], in which the organic compound having the fullerene skeleton is an organic compound in the following general formula (iii), and an average molecular weight of the organic compound is in a range of 3000 to 7000, in which R2 is a perfluoro ether group in the general formulas (a) to (h), and p, q, r, s, t, u, v, w, x, y, and z of the general formulas (a) to (h) are integers of 1 to 100.

[Chem. 17]

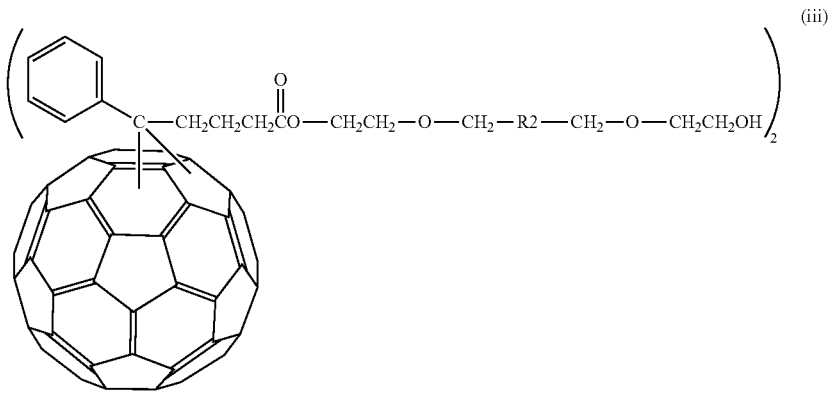

(iii)

[4] A magnetic recording medium including at least a magnetic layer, a protective layer including carbon, or carbon and hydrogen, and a lubricant layer including the lubricant for a magnetic recording medium according to any one of [1] to [3], on a non-magnetic substrate, in this order.

[5] A manufacturing method of a magnetic recording medium including preparing a base including at least a magnetic layer and a protective layer on a non-magnetic substrate in this order; and forming a lubricant layer on the protective layer by dipping the base in a solution for forming a lubricant layer contained in a dipping tank, and then by pulling up the base from the dipping tank at a constant rate, in which the solution for forming a lubricant layer includes an organic compound having a fullerene skeleton, and a fluorine-based solvent, the organic compound having the fullerene skeleton is an organic compound in the general formula (i) according to [1], and solubility of the organic compound having the fullerene skeleton with respect to the fluorine-based solvent is in a range of 0.001 mass % to 2 mass %.

[6] A magnetic recording and reproducing device including the magnetic recording medium according to [4]; a medium-driving unit driving the magnetic recording medium in a recording direction; a magnetic head performing recording and reproducing of information with respect to the magnetic recording medium; a head movement unit relatively moving the magnetic head with respect to the magnetic recording medium; and a recording and reproducing signal-processing unit performing processing of a recording and reproducing signal from the magnetic head.

The lubricant for a magnetic recording medium of the present invention is bonded to the protective layer by a high bonding force, and is able to cover the front surface of the protective layer with high coverage without being in the shape of an island or a net even when the thickness is thin, and thus it is possible to prevent the environmental substance creating the contaminated substance such as ionic impurities from invading from the gap of the lubricant layer including the lubricant for a magnetic recording medium of the present invention.

For this reason, it is possible to effectively prevent the magnetic recording medium from being contaminated by allowing the environmental substance creating the contaminated substance to invade from the gap of the lubricant layer, by aggregating the ionic components in the underlayer of the lubricant layer, and by creating the contaminated substance which contaminates the magnetic recording medium. For this reason, the contaminated substance on the magnetic recording medium decreases.

The magnetic recording medium of the present invention includes the lubricant layer which is able to effectively prevent the front surface of the magnetic recording medium from being contaminated even when the thickness is thin. For this reason, it is possible to make the thickness of the lubricant layer sufficiently thin, it is possible to correspond to further improvement in recording density of the magnetic recording medium, and it is difficult to contaminate the magnetic recording medium even at the time of being used in a high temperature state, and thus the magnetic recording medium of the present invention has excellent environment resistance and a stable magnetic recording and reproducing property.

The manufacturing method of a magnetic recording medium of the present invention includes dipping the base which includes at least the magnetic layer and the protective layer on the non-magnetic base in this order in the solution for forming a lubricant layer contained in the dipping tank, and then pulling up the base from the dipping tank at a constant rate. For this reason, it is possible to uniformly coat the solution for forming a lubricant layer on the front surface on the base, and thus it is possible to manufacture the magnetic recording medium which is difficult to contaminate, and has excellent environment resistance and a stable magnetic recording and reproducing property even at the time of being used in a high temperature state.

The magnetic recording and reproducing device of the present invention includes the magnetic recording medium in which the contaminated substance on the magnetic recording medium decreases. For this reason, the contaminated substance on the magnetic recording medium is transferred to the magnetic head of the magnetic recording and reproducing device, and thus it is possible to prevent a recording and reproducing property from being degraded, or to prevent floating stability from being degraded. As a result, the magnetic recording and reproducing device of the present invention has a stable magnetic recording and reproducing property.

DETAILED DESCRIPTION OF THE INVENTION

Hereinafter, a configuration of embodiments of the present invention will be described with reference to the drawings. In order to understand the characteristics, portions of the drawings used in the following description may be enlarged, a dimension ratio of each constituent or the like is an example, and the present invention is able to be suitably changed within the scope which does not change the gist of the present invention.

Hereinafter, a magnetic recording medium according to one embodiment of the present invention will be described with reference to the drawings, and a lubricant for a magnetic recording medium according to one embodiment of the present invention will be also described.

Figure 1:
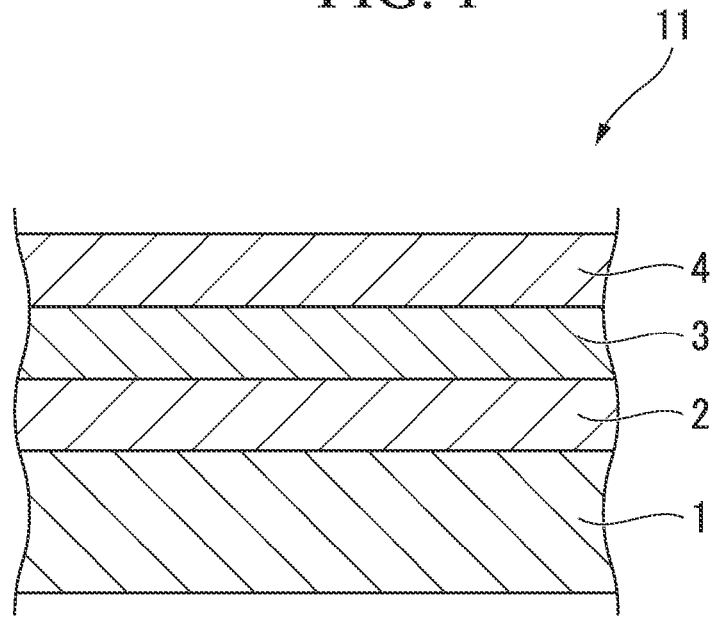
FIG. 1 is a schematic sectional view illustrating an example of a magnetic recording medium according to one embodiment of the present invention.

FIG. 1 is a schematic sectional view illustrating an example of a magnetic recording medium according to one embodiment of the present invention.

A magnetic recording medium 11 illustrated in FIG. 1 includes at least a magnetic layer 2, a protective layer 3, and a lubricant layer 4 on a non-magnetic substrate 1 in this order. The protective layer 3 includes carbon, or carbon and hydrogen, and the lubricant layer 4 includes an organic compound having a fullerene skeleton which is formed to be adjacent to the protective layer 3. The organic compound having the fullerene skeleton is an organic compound shown by a general formula (i). A in the general formula (i) is a group in which any one hydroxyl group on a terminal of any one fluoro compound shown by general formulas (1) to (6) is not included. R2 and R3 of the general formulas (1) to (6) are perfluoro ether groups shown by general formulas (a) to (h), and p, q, r, s, t, u, v, w, x, y, and z of the general formulas (a) to (h) are integers of 1 to 100. As copolymer of the general formulas (c) and (d), block copolymer, alternate copolymer and random copolymer can be used. In other words, repeating unit (($OCF_2CF_2$) and ($OCF_2$) of the general formulas (c), and ($CF_2O$) and ($CF_2CF_2O$) of the general formulas (d)) can be repeated for each block, can be repeated alternately, can be repeated at random.

In the magnetic recording medium 11, an adhesion layer, a soft magnetic underlayer, a seed layer, and an orientation control layer which are not illustrated may be laminated between the non-magnetic substrate 1 and the magnetic layer 2 in this order. Hereinafter, the configuration described above will be described as an example. The adhesion layer, the soft magnetic underlayer, the seed layer, and the orientation control layer may be disposed as necessary, and a part or all of the layers may not be disposed.

Non-Magnetic Substrate

As the non-magnetic substrate 1, a substrate in which a layer formed of NiP or a NiP alloy or other amorphous metal is formed on a base formed of metal such as Al or an Al alloy, or an alloy material, or the like is able to be used. Further, as the non-magnetic substrate 1, a substrate which is formed of a nonmetallic material such as glass, quartz, ceramic, and silicon may be used, or an amorphous metal layer formed of a nonmetallic material on the base may be used.

Adhesion Layer

The adhesion layer prevents the non-magnetic substrate 1 from being corroded when the non-magnetic substrate 1 and the soft magnetic underlayer disposed on the adhesion layer are arranged to be in contact with each other. As a material of the adhesion layer, for example, Cr, a Cr alloy, Ti, a Ti alloy, and the like are able to be suitably selected. It is preferable that a thickness of the adhesion layer be greater than or equal to 2 nm such that an effect of disposing the adhesion layer is sufficiently obtained.

Soft Magnetic Underlayer

It is preferable that the soft magnetic underlayer have a structure in which a first soft magnetic underlayer, an intermediate layer formed of a Ru layer, and a second soft magnetic underlayer are laminated in this order. That is, it is preferable that the soft magnetic underlayer have a structure in which the intermediate layer formed of the Ru layer is inserted between two soft magnetic underlayers, and thus the upper and lower soft magnetic underlayers of the intermediate layer are bonded by anti-ferro-coupling (AFC). The soft magnetic underlayer has the bonded AFC structure, and thus it is possible to increase resistance from the outside with respect to a magnetic field, and resistance with respect to a Wide Area Tack Erasure (WATE) phenomenon which is a problem specific to perpendicular magnetic recording.

A layer thickness of the soft magnetic underlayer is preferably in a range of 15 nm to 80 nm, and more preferably in a range of 20 nm to 50 nm. When the layer thickness of the soft magnetic underlayer is less than 15 nm, a magnetic flux from a magnetic head is not sufficiently absorbed, writing is insufficient, and a recording and reproducing property is degraded, and thus it is not preferable. In contrast, when the layer thickness of the soft magnetic underlayer exceeds 80 nm, productivity is remarkably reduced, and thus it is not preferable.

It is preferable that the first soft magnetic underlayer and the second soft magnetic underlayer be formed of a CoFe alloy. When the first soft magnetic underlayer and the second soft magnetic underlayer are formed of the CoFe alloy, it is possible to realize high saturation magnetic flux density Bs (greater than or equal to 1.4 (T)).

Any one of Zr, Ta, Nb, and B may be added to the CoFe alloy used in the first soft magnetic underlayer and the second soft magnetic underlayer. Accordingly, non-crystallization of the first soft magnetic underlayer and the second soft magnetic underlayer is promoted, an orientational property of the seed layer is able to be improved, and it is possible to reduce the floating distance of the magnetic head.

Seed Layer

The seed layer is to suppress orientation or a crystal size of the orientation control layer and the magnetic layer 2 which are disposed on the seed layer. By disposing the seed layer, a vertical directional component of the magnetic flux generated from the magnetic head with respect to a substrate surface increases, and a magnetization direction of the magnetic layer 2 is able to be more strongly fixed to a direction perpendicular to the non-magnetic substrate 1.

It is preferable that the seed layer be formed of a NiW alloy. When the seed layer is formed of the NiW alloy, other elements such as B, Mn, Ru, Pt, Mo, and Ta may be added to the NiW alloy as necessary.

It is preferable that a layer thickness of the seed layer be in a range of 2 nm to 20 nm. When the layer thickness of the seed layer is less than 2 nm, an effect of disposing the seed layer may not be sufficiently obtained. In contrast, when the layer thickness of the seed layer exceeds 20 nm, the crystal size increases, and thus it is not preferable.

Orientation Control Layer

The orientation control layer is to control the magnetic layer 2 such that the orientation of the magnetic layer 2 becomes excellent. It is preferable that the orientation control layer be formed of Ru or a Ru alloy.

It is preferable that a layer thickness of the orientation control layer be in a range of 5 nm to 30 nm. When the layer thickness of the orientation control layer is less than or equal to 30 nm, a distance between the magnetic head and the soft magnetic underlayer decreases, and thus it is possible to make the magnetic flux from the magnetic head steep. When the layer thickness of the orientation control layer is greater than or equal to 5 nm, it is possible to preferably control the orientation of the magnetic layer 2.

The orientation control layer may be formed of one layer, or may be formed of a plurality of layers. When the orientation control layer is formed of a plurality of layers, all the orientation control layers may be formed of the same material, or at least a part of the orientation control layers may be formed of a different material.

Magnetic Layer

The magnetic layer 2 is formed of a magnetic layer of which an easy magnetization axis is directed in a direction perpendicular to the substrate surface. The magnetic layer 2 contains Co and Pt, and further may contain oxide, Cr, B, Cu, Ta, Zr, and the like in order to improve an SNR property. As oxide contained in the magnetic layer 2, $B_2O_3$, $SiO_2$, SiO, $Cr_2O_3$, CoO, $Ta_2O_3$, $TiO_2$, and the like are able to be used.

The magnetic layer 2 may be formed of one layer, or may be formed of a plurality of layers formed of materials having different compositions.

For example, when the magnetic layer 2 is formed of three layers of the first magnetic layer, the second magnetic layer, and a third magnetic layer, the first magnetic layer contains Co, Cr, and Pt, and further, it is preferable that the magnetic layer 2 have a granular structure formed of a material containing oxide. As oxide contained in the first magnetic layer, for example, oxides such as Cr, Si, Ta, Al, Ti, Mg, and Co are preferably used. Among them, in particular, $TiO_2$, $Cr_2O_3$, $SiO_2$, and the like are able to be preferably used. It is preferable that the first magnetic layer be formed of composite oxide into which two or more types of oxides are added. Among them, in particular, $Cr_2O_3$—$SiO_2$, $Cr_2O_3$—$TiO_2$, $SiO_2$—$TiO_2$, and the like are able to be preferably used.

The first magnetic layer is able to contain at least one element selected from B, Ta, Mo, Cu, Nd, W, Nb, Sm, Tb, Ru, and Re in addition to Co, Cr, Pt, and oxide. By containing the element described above, fineness of magnetic particles is able to be promoted, or a crystalline property or an orientational property is able to be improved, and thus it is possible to obtain a recording and reproducing property and a thermal fluctuation property suitable for higher density recording.

In the second magnetic layer, the same material as that of the first magnetic layer is able to be used. It is preferable that the second magnetic layer have a granular structure.

It is preferable that the third magnetic layer contain Co, Cr, and Pt, and have a non-granular structure formed of a material not including oxide. The third magnetic layer is able to contain at least one element selected from B, Ta, Mo, Cu, Nd, W, Nb, Sm, Tb, Ru, Re, and Mn in addition to Co, Cr, and Pt. The third magnetic layer contains the element described above in addition to Co, Cr, and Pt, and thus fineness of the magnetic particles is able to be promoted, or a crystalline property or an orientational property is able to be improved, and it is possible to obtain a recording and reproducing property and a thermal fluctuation property suitable for higher density recording.

It is preferable that a thickness of the magnetic layer 2 be 5 to 25 nm. When the thickness of the magnetic layer 2 is less than the range described above, sufficient reproduction output is not obtained, and a thermal fluctuation property is degraded. When the thickness of the magnetic layer 2 exceeds the range described above, bloating of the magnetic particles in the magnetic layer 2 occurs, noise increases at the time of performing recording and reproducing, and a recording and reproducing property represented by a signal/noise ratio (a S/N ratio) or a recording property (OW) is degraded, and thus it is not preferable.

When the magnetic layer 2 is formed of a plurality of layers, it is preferable that a non-magnetic layer be disposed between the adjacent magnetic layers. When the magnetic layer 2 is formed of three layers of the first magnetic layer, the second magnetic layer, and the third magnetic layer, it is preferable that the non-magnetic layer be disposed between the first magnetic layer and the second magnetic layer, and between the second magnetic layer and the third magnetic layer.

By disposing the non-magnetic layer between the magnetic layers with a suitable thickness, magnetization inversion of each layer is easily performed. For this reason, it is possible to reduce a dispersion of the magnetization inversion of the entirety of the magnetic particles, and it is possible to improve the S/N ratio.

In the non-magnetic layer disposed between the magnetic layers 2, for example, Ru, a Ru alloy, a CoCr alloy, a $CoCrX_1$ alloy ($X_1$ is at least one or two elements selected from Pt, Ta, Zr, Re, Ru, Cu, Nb, Ni, Mn, Ge, Si, O, N, W, Mo, Ti, V, Zr, and B), and the like are able to be preferably used.

As the non-magnetic layer disposed between the magnetic layers 2, an alloy material containing oxide, metallic nitride, or metallic carbide is able to be preferably used. Specifically, as oxide, for example, $SiO_2$, $Al_2O_3$, $Ta_2O_5$, $Cr_2O_3$, $MgO$, $Y_2O_3$, $TiO_2$, $B_2O_3$, and the like are able to be used, as metallic nitride, for example, AlN, $Si_3N_4$, TaN, CrN, and the like are able to be used, and as metallic carbide, for example, TaC, BC, SiC, and the like are able to be used.

It is preferable that a thickness of the non-magnetic layer disposed between the magnetic layers 2 be 0.1 to 1 nm. When the thickness of the non-magnetic layer is in the range described above, it is possible to further improve the S/N ratio.

In order to higher recording density, it is preferable that the magnetic layer 2 be a magnetic layer of perpendicular magnetic recording of which an easy magnetization axis is directed in the direction perpendicular to the substrate surface, and the magnetic layer 2 may be a magnetic layer of in-plane magnetic recording.

Protective Layer

The protective layer 3 is to protect the recording layer 2. The protective layer 3 may be formed of one layer, or may be formed of a plurality of layers. The protective layer 3 of this embodiment contains carbon, or carbon and hydrogen, and may further contain nitrogen or the like. The lubricant layer 4 formed on the protective layer 3 has an extremely high bonding force with respect to carbon. The protective layer 3 contains carbon, or carbon and hydrogen, and thus carbon atoms contained in the protective layer 3 and the lubricant layer 4 are bonded, and the protective layer 3 and the lubricant layer 4 are bonded by a high bonding force. As a result, even when a thickness of the lubricant layer 4 is thin, the magnetic recording medium 11 in which a front surface of the protective layer 3 is covered with high coverage is obtained, and thus it is possible to effectively prevent a front surface of the magnetic recording medium 11 from being contaminated.

It is preferable that a layer thickness of the protective layer 3 be in a range of 1 nm to 10 nm. When the layer thickness of the protective layer 3 is in the range described above, it is possible to sufficiently reduce magnetic spacing of a magnetic recording and reproducing device including the magnetic recording medium 11 of this embodiment, it is possible to correspond to further improvement in recording density, and it is possible to improve durability. The magnetic spacing indicates a distance between the magnetic head and the magnetic layer 4. As the magnetic spacing is reduced, it is possible to improve an electromagnetic conversion property of the magnetic recording and reproducing device.

When the layer thickness of the protective layer 3 is less than 1 nm, an effect for protecting the recording layer 2 may be insufficient. When the layer thickness of the protective layer 3 exceeds 10 nm, the magnetic spacing may be insufficiently reduced.

Lubricant Layer

The lubricant layer 4 includes a lubricant for a magnetic recording medium according to one embodiment of the present invention.

The lubricant layer 4 prevents the magnetic recording medium 11 from being contaminated, and reduces a friction force of the magnetic head of the magnetic recording and reproducing device sliding on the magnetic recording medium, and thus improves durability of the magnetic recording medium 11.

The lubricant layer 4 includes an organic compound having a fullerene skeleton which is formed to be adjacent to the protective layer 3, and the organic compound having the fullerene skeleton is expressed by the general formula (i), where A is a group in which any one hydroxyl group on a terminal of any one fluoro compound in the general formulas (1) to (6) is not included.

By using the organic compound having the fullerene skeleton in the lubricant 4, it is possible to increase an interactive force with respect to the protective layer 3 formed of carbon, or carbon and hydrogen. The fullerene is an allotropic form of carbon in which 60 carbon atoms are bonded to be in the shape of a soccer ball, and a π electron is directed toward all azimuths, and thus it is possible to increase the interactive force with respect to the protective layer 3 formed of carbon, or carbon and hydrogen.

Originally, a usual fullerene is a solid at a normal temperature, and is difficult to melt in a solvent, and thus it is difficult to coat the front surface of the magnetic recording medium 11. However, the organic compound having the fullerene skeleton is used, and thus is able to be melted in a fluorine-based solvent. Accordingly, even when the thickness of the lubricant layer 4 is thin, it is possible to cover the front surface of the protective layer 3 with high coverage without being in the shape of an island or a net. That is, the organic compound having the fullerene skeleton is used, and thus it is possible to increase the interactive force with respect to the protective layer 3 formed of carbon, or carbon and hydrogen, and even when the thickness of the lubricant layer 4 is thin, it is possible to cover the front surface of the protective layer 3 with high coverage without being in the shape of an island or a net.

The lubricant layer 4 includes the organic compound having the fullerene skeleton in the general formula (i). The fullerene skeleton is a soccer ball-like structure formed of 60 carbon atoms, in which the number of 6-membered rings is 20, and the number of 5-membered rings is 12, the number of single bonds is 60, and the number of double bonds is 30. In the organic compound having the fullerene skeleton in the general formula (i), n double bonds in the fullerene skeleton (n is an integer of 1 to 4) are broken, and a new carbon atom is bonded in each portion where the double bonds are broken by a single bond, and each new carbon atom is bonded to an organic group having 1 to 24 carbon atoms and to a —$(CH_2)_m$COO— group by a single bond.

In the organic compound in the general formula (i), a bond position in a case where two or more new carbon atoms are bonded to the fullerene skeleton is arbitrary, and it is preferable that each carbon atom be bonded in a symmetric position with respect to a center of the fullerene skeleton in order to increase structure stability of a created compound.

All the fluoro compounds in the general formulas (1) to (6) are stable substances as a fluorine-based lubricant, and have a plurality of hydroxyl groups on a terminal, and thus it is possible to obtain a high bonding force with respect to carbon or hydrogen forming the protective layer 3 through the hydroxyl group. When the organic compound having the fullerene skeleton is synthesized, the fluoro compound in the general formulas (1) to (6) has a plurality of hydroxyl groups even when one hydroxyl group on the terminal of the fluoro compound in the general formulas (1) to (6) is lost, and thus the remaining hydroxyl groups are bonded to carbon or hydrogen forming the protective layer 3, and it is possible to obtain a high bonding force between the protective layer 3 and the lubricant layer 4.

In addition, R2 and R3 in the fluoro compound in the general formulas (1) to (6), are able to use a perfluoro ether group in the general formulas (a) to (h). A specific example thereof is as follows.

As the compound in the general formula (1), it is preferable that an average molecular weight be in a range of 1000 to 4000. For example, Z-DOL (a product name) manufactured by Solvay, Ltd. is included. In Z-DOL, R2 of the general formula (1) is the general formula (c), r and s are in a range of 4 to 30, and an average molecular weight is in a range of 1000 to 4000.

As the compound in the general formula (2), it is preferable that an average molecular weight be in a range of 1000 to 4000. For example, Z-DOL (a product name) manufactured by Solvay, Ltd. is able to be manufactured as a raw material.

As the compound in the general formula (3), it is preferable that an average molecular weight be in a range of 1000 to 4000. For example, FOMBLIN TX2000 (a product name) manufactured by Solvay, Ltd. is included. In TX2000, R2 of the general formula (3) is the general formula (c), r and s are in a range of 4 to 30, and an average molecular weight is in a range of 1000 to 4000.

As the compound in the general formula (4), it is possible that an average molecular weight be in a range of 1000 to 8000. For example, D4OH (a product name) manufactured by Moresco Co., Ltd. is included. In D4OH, R2 of the general formula (4) is the general formula (g), y is in a range of 4 to 30, and an average molecular weight is in a range of 1000 to 4000. It is also preferable that R2 be the general formula (h), z be in a range of 4 to 30, and an average molecular weight be in a range of 1000 to 4000.

As the compound in the general formula (5), it is preferable that an average molecular weight be in a range of 1000 to 5000. For example, QA-40 (a product name) manufactured by Asahi Glass Co., Ltd. is included. In QA-40, R2 of the general formula (5) is the general formula (a), R3 is the general formula (b), p and q are in a range of 4 to 10, and an average molecular weight is in a range of 2000 to 5000.

As the compound in the general formula (6), it is preferable that an average molecular weight be in a range of 1000 to 5000. For example, QG-40 (a product name) manufactured by Asahi Glass Co., Ltd. in which a terminal group of QA-40 (a product name) manufactured by Asahi Glass Co., Ltd. is set to tetraol is included. In QG-40, R2 of the general formula (6) is the general formula (a), R3 is the general formula (b), p and q are in a range of 4 to 10, and an average molecular weight is in a range of 2000 to 5000.

As the organic compound having the fullerene skeleton, it is preferable that an organic compound in the general formula (ii) in which R1 of the general formula (i) is a phenyl group, m is 3, and n is 2 be used. The organic compound in the general formula (ii), A of the general formula (ii), is a substituent group in which any one hydroxyl group on a terminal of any one fluoro compound in the general formulas (1) to (6) is not included, and thus it is possible to set solubility with respect to the fluorine-based solvent to be in a suitable range. For this reason, a coating property with respect to the protective layer 3 is excellent, and thus it is possible to cover the front surface of the protective layer 3 with high coverage without being in the shape of an island or a net even when the thickness of the lubricant layer 4 is thin.

As the organic compound having the fullerene skeleton contained in the lubricant layer 4, an organic compound in the general formula (iii) is used, and it is preferable that an average molecular weight of the organic compound be in a range of 3000 to 7000. In the organic compound in the general formula (iii), R1 of the organic compound of the general formula (i) is a phenyl group, m is 3, n is 2, and A is obtained as a group in which one hydroxyl group on a terminal of the fluoro compound in the general formula (3) is not included. As R2 of the compound, any one perfluoro ether group in the general formulas (a) to (h) is able to be used.

Among them, in particular, it is preferable that an average molecular weight of the compound be in a range of 3000 to 7000 in order to improve coverage of the lubricant layer 4 with respect to the front surface of the protective layer 3. As the organic compound having the fullerene skeleton contained in the lubricant layer 4, it is preferable that an organic compound in the following general formula (iv) in which a bond position of an organic group with respect to a fullerene skeleton is in a symmetric position as the organic compound in the general formula (iii) is used. This is because the organic compound of the general formula (iv) is a compound having a stable structure in the general formula (iii).

The environmental substance creating the contaminated substance, for example, is ionic impurities, as a metallic ion contained in the ionic impurities, for example, a sodium ion, a potassium ion, and the like are able to be included, and as an inorganic ion, for example, a silicon ion, a chlorine ion, a $HCO_3$ ion, a $HSO_4$ ion, a sulfate ion, an ammonia ion, an oxalate ion, a formate ion, and the like are able to be included.

[Chem. 18]

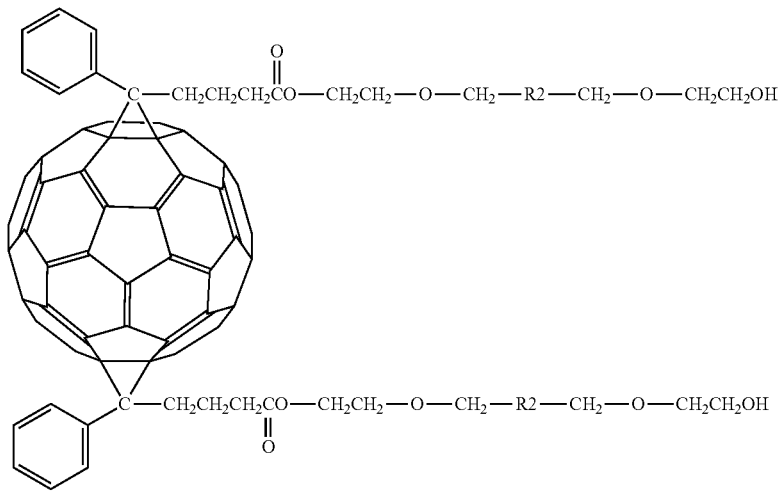

(iv)

An average layer thickness of the lubricant layer 4 is preferably in a range of 0.8 nm (8 Å) to 2 nm (20 Å), and especially preferably in a range of 1 nm to 1.9 nm. When the average layer thickness of the lubricant layer 4 is greater than or equal to 0.8 nm, it is possible to cover the front surface of the protective layer 3 with high coverage in a uniform layer thickness without being in the shape of an island or a net. When the average layer thickness of the lubricant layer 4 is less than or equal to 2 nm, the floating quantity of the magnetic head is sufficiently reduced, and thus it is possible to increase recording density of the magnetic recording medium 11.

When the front surface of the protective layer 3 is not covered with the lubricant layer 4 at sufficiently high coverage, water including an environmental substance which creates a contaminated substance such as ionic impurities adsorbed on the front surface of the magnetic recording medium 11 passes through a gap of the lubricant layer 4, and thus invades below the lubricant layer 4. The environmental substance invading into the underlayer of the lubricant layer creates an ionic contaminated substance by aggregating minor ionic components hidden below the lubricant layer 4. Then, the contaminated substance (a aggregation component) is attached (transferred) to the magnetic head at the time of performing the magnetic recording and reproducing, and thus the magnetic head is damaged, or a magnetic recording and reproducing property of the magnetic recording and reproducing device is degraded. Such a problem due to the invasion of the environmental substance from the gap of the lubricant layer 4 more remarkably occurs when the magnetic recording medium 11 is maintained under a high temperature condition.

The magnetic recording medium 11 of this embodiment includes at least the magnetic layer 2, the protective layer 3, and the lubricant layer 4 on the non-magnetic substrate 1 in this order. The protective layer 3 includes carbon, or carbon and hydrogen, and the lubricant layer 4 is formed to be adjacent to the protective layer 3 and includes the organic compound having the fullerene skeleton, and thus the lubricant layer 4 and the protective layer 3 are bonded at a high bonding force, and it is possible to make the thickness of the lubricant layer 4 sufficiently thin.

That is, the magnetic recording medium 11 of this embodiment includes the lubricant layer which is able to cover the front surface of the protective layer with high coverage in an approximately uniform layer thickness without being in the shape of an island or a net even when the thickness is thin, and thus prevents the environmental substance creating the contaminated substance such as the ionic impurities from invading from the gap of the lubricant layer 4. Accordingly, in the magnetic recording medium 11 of this embodiment, the contaminated substance on the magnetic recording medium decreases.

Manufacturing Method of Magnetic Recording Medium

A manufacturing method of the magnetic recording medium of the present invention includes a step of preparing the base including at least the magnetic layer 2 and the protective layer 3 on the non-magnetic substrate in this order, a step of forming the lubricant layer on the protective layer by dipping the base in a solution for forming a lubricant layer contained in a dipping tank, and then by pulling up the base from the dipping tank at a constant rate.

The solution for forming a lubricant layer includes the organic compound having the fullerene skeleton, and the fluorine-based solvent, and the organic compound having the fullerene skeleton is the organic compound in the general formula (i) described above, and solubility of the organic compound having the fullerene skeleton with respect to the fluorine-based solvent is in a range of 0.001 mass % to 2 mass %.

The step of preparing the base including at least the magnetic layer 2 and the protective layer 3 on the non-magnetic substrate in this order is not particularly limited, and a known method of the related art is able to be used. For example, the adhesion layer, the soft magnetic underlayer, the seed layer, the orientation control layer, and the non-magnetic layer described above are able to be formed by using a sputtering method. The magnetic layer 2 is able to be formed by any known method of the related art such as a vapor-deposition method, an ion-beam sputtering method, and a magnetron sputtering method. In general, the sputtering method is used. As a layer forming method of the protective layer 3, a sputtering method using a carbon target material, a chemical vapor-deposition (CVD) method using a hydrocarbon raw material such as ethylene or toluene, an ion beam deposition (IBD) method, and the like are able to be used.

The step of forming the lubricant layer 4 is not particularly limited, and for example, a spin coat method, a dip coating method, and the like are able to be used. When the dip coating method is used, for example, a method for coating the front surface of the protective layer 3 of the base with the solution for forming a lubricant layer by dipping the base in which at least the magnetic layer and the protective layer 3 are formed on the non-magnetic base 1 in the solution for forming a lubricant layer contained in the dipping tank of a dip coating apparatus, and then by pulling up the base from the dipping tank at a predetermined rate is able to be used. By using the dip coating method, it is possible to uniformly coat the front surface of the protective layer 3 of the base with the solution for forming a lubricant layer, and thus it is possible to form the lubricant layer 4 on the protective layer 3 with a uniform layer thickness.

It is preferable that solubility of the organic compound having the fullerene skeleton with respect to the fluorine-based solvent be in a range of 0.001 mass % to 2 mass %. It is more preferable that the solubility be in a range of 0.01 mass % to 1 mass %.

When the solubility is less than 0.001 mass %, the lubricant is excessively melted in the fluorine-based solvent, and thus the lubricant coated on the front surface of the protective layer 3 is washed away by the fluorine-based solvent. In contrast, when the solubility exceeds 2 mass %, the lubricant 4 is not able to be melted in the fluorine-based solvent, and thus it is not possible to use a dip coating method at the time of coating the lubricant.

As a solvent used in the solution for forming a lubricant layer, for example, a fluorine-based solvent such as Vertrel XF (a trade name, manufactured by Du Pont-Mitsui Fluorochemicals Co., Ltd.) is included.

Magnetic Recording and Reproducing Device

Figure 2:
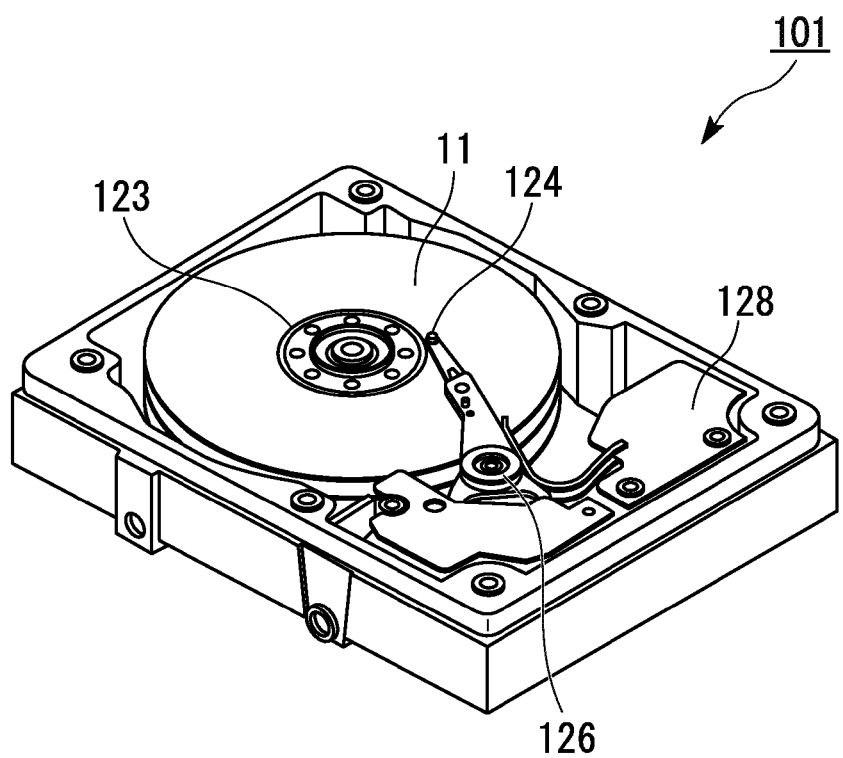
FIG. 2 is a perspective view illustrating an example of a magnetic recording and reproducing device according to one embodiment of the present invention.

Next, an example of a magnetic recording and reproducing device which is an embodiment of the present invention will be described. FIG. 2 is a perspective view illustrating an example of a magnetic recording and reproducing device which is an embodiment of the present invention. A magnetic recording and reproducing device 101 which is an embodiment of the present invention includes the magnetic recording medium 11 illustrated in FIG. 1 which is an embodiment of the present invention, a medium-driving unit 123 which drives the magnetic recording medium 11 in a recording direction, a magnetic head 124 which includes a recording unit and a reproducing unit, a head movement unit 126 which relatively moves the magnetic head 124 with respect to the magnetic recording medium 11, and a recording and reproducing signal-processing unit 128 which performs processing of a recording and reproducing signal from the magnetic head 124.

An element unit (a reproducing unit) of the magnetic head 124 is configured by a GMR head or a TMR head, and thus it is possible to obtain sufficient signal intensity even in magnetic recording medium which has high recording density, and the magnetic recording and reproducing device with high recording density is able to be realized. When a floating distance of the magnetic head 124 is 0.005 μm (5 nm) to 0.020 μm (20 nm), that is, the magnetic head 124 is floated at a height lower than that in the related art, the output is improved and a high SNR is obtained, and thus it is possible to obtain the magnetic recording and reproducing device with large capacity and high reliability.

The magnetic recording and reproducing device 101 of this embodiment includes the magnetic recording medium 11 in which the contaminated substance on the magnetic recording medium decreases, and thus the contaminated substance on the magnetic recording medium 11 is transferred to the magnetic head 124 of the magnetic recording and reproducing device 101, and a recording and reproducing property is prevented from being degraded, or floating stability is prevented from being degraded. Therefore, the magnetic recording and reproducing device 101 of the present invention has a stable magnetic recording and reproducing property.

EXAMPLE

Hereinafter, Examples of the present invention will be described in detail. The present invention is not limited to Examples.

Example 1

A cleaned glass substrate (manufactured by HOYA Corporation, an outer dimension of 65 mm) was contained in a layer forming chamber of a DC magnetron sputtering apparatus (C-3040 manufactured by Anelva Corporation), and the layer forming chamber was evacuated until an ultimate vacuum degree is $1 \times ^{-5}$ Pa.

An adhesion layer having a layer thickness of 10 nm was formed on the glass substrate by a sputtering method using a CrTi target. As the soft magnetic underlayer, a first soft magnetic underlayer having a layer thickness of 25 nm was formed on the adhesion layer by the sputtering method using a target of Co-20Fe-5Zr-5Ta {a Fe content of 20 atom %, a Zr content of 5 atom %, a Ta content 5 of atom %, and remnant Co} at a substrate temperature lower than or equal to 100° C., and an intermediate layer of Ru having a layer thickness of 0.7 nm and a second soft magnetic underlayer of Co-20Fe-5Zr-5Ta having a layer thickness of 25 nm were formed thereon.

A seed layer having a layer thickness of 5 nm was formed on the soft magnetic underlayer by the sputtering method using a target of Ni-6W {a W content of 6 atom %, and remnant Ni}. Then, as the first orientation control layer, a Ru layer having a layer thickness of 10 nm was formed on the seed layer by the sputtering method at a sputtering pressure of 0.8 Pa. Next, as the second orientation control layer, a Ru layer having a layer thickness of 10 nm was formed on the first orientation control layer by the sputtering method at a sputtering pressure of 1.5 Pa.

A first magnetic layer of 91(Co15Cr16Pt)-6($SiO_2$)-3($TiO_2$) {a Cr content of 15 atom %, a Pt content of 16 atom %, an alloy of remnant Co of 91 mol %, oxide of $SiO_2$ of 6 mol %, and oxide of $TiO_2$ of 3 mol %} having a layer thickness of 9 nm was formed on the second orientation control layer by the sputtering method at a sputtering pressure of 2 Pa.

A non-magnetic layer of 88(Co30Cr)-12($TiO_2$) {a Cr content of 30 atom %, an alloy of remnant Co of 88 mol %, and oxide of $TiO_2$ of 12 mol %} having a layer thickness of 0.3 nm was formed on the first magnetic layer by the sputtering method. Then, a second magnetic layer of 92(Co11Cr18Pt)-5($SiO_2$)-3($TiO_2$) {a Cr content of 11 atom %, a Pt content of 18 atom %, an alloy of remnant Co of 92 mol %, oxide of $SiO_2$ of 5 mol %, and oxide of $TiO_2$ of 3 mol %} having a layer thickness of 6 nm was formed on the non-magnetic layer by the sputtering method at a sputtering pressure of 2 Pa.

A non-magnetic layer of Ru having a layer thickness of 0.3 nm was formed on the second magnetic layer by the sputtering method. Next, a third magnetic layer having a layer thickness of 7 nm was formed on the non-magnetic layer by the sputtering method using a target of Co-20Cr-14Pt-3B {a Cr content of 20 atom %, a Pt content of 14 atom %, a B content of 3 atom %, and remnant Co} at a sputtering pressure of 0.6 Pa. Next, a protective layer of carbon and hydrogen having a layer thickness of 20 nm was formed by a CVD method. A hydrogen content in the protective layer was approximately 15 atom %.

An organic compound having a fullerene skeleton (hereinafter, referred to as a "fullerene compound") which was used as the lubricant was synthesized. That is, 1 g of [6,6]-diphenylC62-bisbutylic acid methyl ester, 18.2 g of FOMBLIN TX2000 manufactured by Solvay, Ltd., and 0.38 g of p-toluenesulfonic acid monohydrate were added to hexafluorobenzene (100 mL), and were heated to reflux while being stirred for 72 hours under a nitrogen gas stream. Then, the reactant was subjected to sequential separated liquid cleaning by 0.1 mole of ammonia water and pure water, and then hexafluorobenzene was distilled. Then, the created product was purified and FOMBLIN TX2000 was removed from the created product, and thus 1.5 g of a fullerene compound having a structure in the general formula (iii) (R2 was the general formula (c), and an average molecular weight was 5000) was obtained.

The synthesized fullerene compound was dissolved in Vertrel XF (a trade name, manufactured by Du Pont-Mitsui Fluorochemicals Co., Ltd.), and a solution for forming a lubricant layer was obtained. A concentration of the fullerene compound (the lubricant) was 0.3 mass %. Solubility of the synthesized fullerene compound with respect to Vertrel XF was 0.4 mass %.

The lubricant was coated on the protective layer by using a dip coating method. That is, a base in which at least the magnetic layer and the protective layer are formed was dipped in the solution for forming a lubricant layer contained in the dipping tank of the dip coating apparatus, and then the base was pulled up from the dipping tank at a constant rate, and thus the solution for forming a lubricant layer was coated on a front surface of the protective layer of the base. A layer thickness of a lubricant layer was 1.4 nm.

Examples 2 to 4

The magnetic recording medium was manufactured in the same manner as in Example 1, but in Example 2 to 4, a structure of the fullerene compound as the lubricant was changed. That is, in Example 1, two organic groups were bonded to the fullerene skeleton, but in Example 2, a compound in the following general formula (v) in which one organic group which was identical to that of Example 1 was bonded was used, in Example 3, a compound in the following general formula (vi) in which three (n=3) organic groups were bonded was used, and in Example 4, a compound in the following general formula (vii) in which four (n=4) organic groups were bonded was used. Solubilities of the synthesized fullerene compounds with respect to Vertrel XF were 0.05 mass % (n=1), 0.6 mass % (n=3), and 0.9 mass % (n=4), respectively. Here, R2 was the general formula (c).

[Chem. 19]

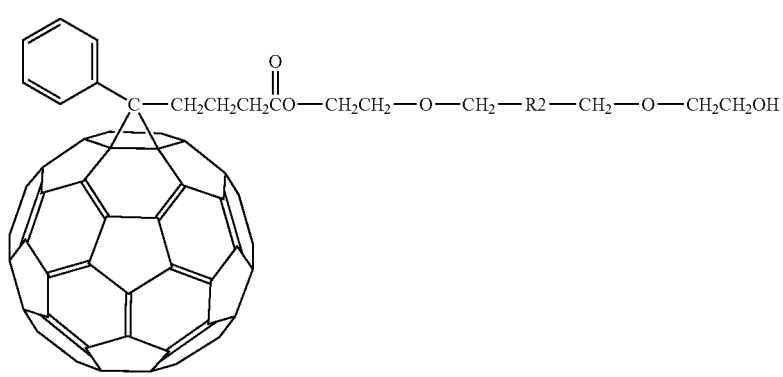

(v)

-continued

[Chem. 20]

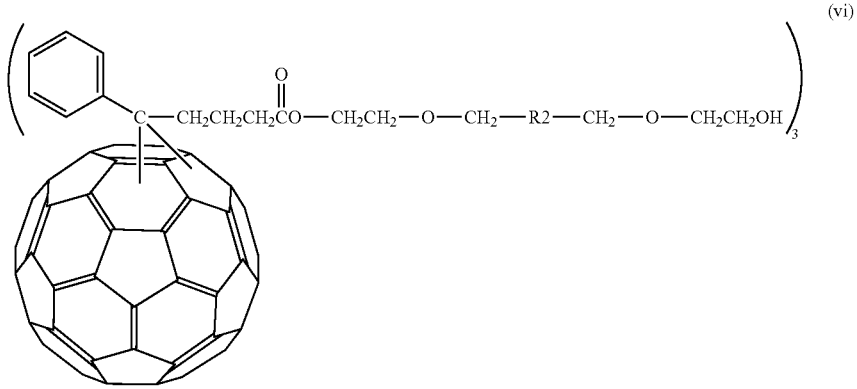

(vi)

[Chem. 21]

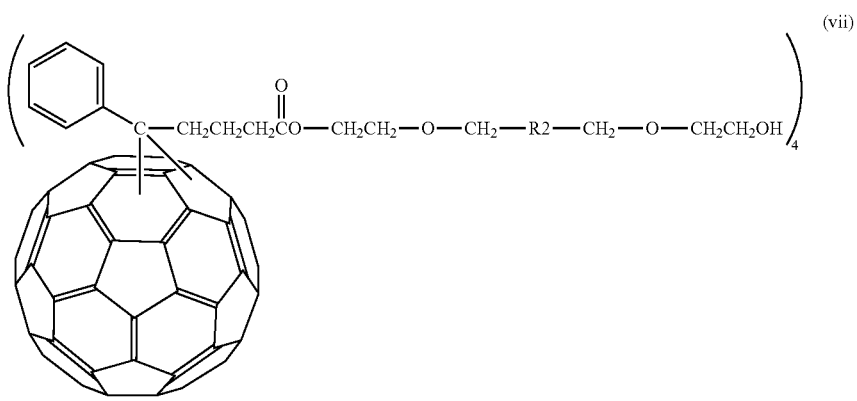

(vii)

Comparative Examples 1 and 2

The magnetic recording medium was manufactured in the same manner as in Example 1, but in Comparative Example 1, QA-40 (a product name) manufactured by Asahi Glass Co., Ltd. in which the fullerene skeleton is not included in the lubricant was used, and in Comparative Example 2, QG-40 (a product name) manufactured by Asahi Glass Co., Ltd. was used.

Environment Resistance Evaluation of Magnetic Recording Medium

Environment resistance of the magnetic recording medium of Example 1 was evaluated by the following method. The evaluation of the environment resistance described later was one of evaluation methods for investigating contamination of the magnetic recording medium due to the environmental substance creating the contaminated substance under a high temperature environment. In the evaluation of the environment resistance described later, as the environmental substance creating the contaminated substance under a high temperature environment, a Si ion was used, and as an amount of the contaminated substance which was created by the environmental substance and contaminated the magnetic recording medium, an adsorbed amount of Si was measured.

Specifically, first, the magnetic recording medium which was an evaluation target was maintained at a high temperature environment where a temperature was 85° C. and humidity was 0%, for 240 hours in the presence of siloxane-based Si rubber. Next, the adsorbed amount of Si on the front surface of the magnetic recording medium was analyzed and measured by using a time-of-flight Secondary Ion Mass Spectrometry (tof-SIMS), and a degree of contamination due to the Si ion which was the environmental substance occurring at a high temperature environment was evaluated as the adsorbed amount of Si. Evaluation results are shown in Table 1.

TABLE 1

| | Lubricant | Adsorbed Amount of Si (Arbitrary Value) |
|---|---|---|
| Example 1 | General Formula (iii) | 10 |
| Example 2 | General Formula (v) | 60 |
| Example 3 | General Formula (vi) | 20 |
| Example 4 | General Formula (vii) | 30 |
| Comparative Example 1 | QA-40 | 300 |
| Comparative Example 2 | QG-40 | 300 |

The magnetic recording medium, the manufacturing method thereof, and the magnetic recording and reproducing device of the present invention are able to be used in industry where a magnetic recording medium having high recording density and a magnetic recording and reproducing device are used and manufactured.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 ... non-magnetic substrate, 2 ... magnetic layer, 3 ... protective layer, 4 ... lubricant layer, 11 ... magnetic recording medium, 101 ... magnetic recording and reproducing device, 123 ... medium driving unit, 124 ... magnetic head, 126 ... head movement unit, 128 ... recording and reproducing signal processing unit.

What is claimed is:

1. A lubricant for a magnetic recording medium which includes an organic compound having a fullerene skeleton, wherein the organic compound having the fullerene skeleton is expressed by the following general formula (i), wherein A is a group in which any one hydroxyl group on a terminal of any one fluoro compound in the following general formulas (1) to (6) is not included, R1 is an organic group having 1 to 24 carbon atoms, m is an integer of 0 to 5, n is an integer of 1 to 4, R2 and R3 of the following general formulas (1) to (6) are perfluoro ether groups in the following general formulas (a) to (h), and p, q, r, s, t, u, v, w, x, y, and z of the following general formulas (a) to (h) are integers of 1 to 100.

[Chem. 1]

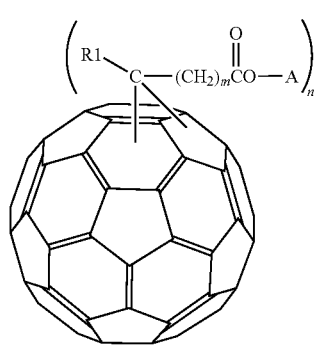

(i)

[Chem. 2]

HOCH$_2$—R2-CH$_2$OH (1)

[Chem. 3]

HOCH$_2$CH$_2$—R2-CH$_2$CH$_2$OH (2)

[Chem. 4]

HOCH$_2$CH$_2$—O—CH$_2$—R2-CH$_2$—O—CH$_2$CH$_2$OH (3)

[Chem. 5]

HOCH$_2$CH(OH)CH$_2$OCH$_2$—R2-CH$_2$OCH$_2$CH(OH)CH$_2$OH (4)

[Chem. 6]

$$\begin{array}{ll} \text{HOCH}_2\text{—R2—OCF}_2 & \text{CF}_2\text{O—R3—CH}_2\text{OH} \\ \phantom{\text{HOCH}_2\text{—R2—}}|\phantom{\text{OCF}_2} & \phantom{\text{CF}_2\text{O—R3}}| \\ \phantom{\text{HOCH}_2\text{—R2—}}\text{CFCF}_2\text{OCF}_2\text{CF} \\ \phantom{\text{HOCH}_2\text{—R2—}}|\phantom{\text{OCF}_2} & \phantom{\text{CF}_2\text{O—R3}}| \\ \text{HOCH}_2\text{—R2—O} & \text{O—R3—CH}_2\text{OH} \end{array} \quad (5)$$

[Chem. 7]

$$\begin{array}{l} \text{HOCH}_2\text{CH(OH)CH}_2\text{OCH}_2\text{—R2—OCFCF}_2\text{O—R3—CH}_2\text{OCH}_2\text{CH(OH)CH}_2\text{OH} \\ \phantom{\text{HOCH}_2\text{CH(OH)CH}_2\text{OCH}_2\text{—R2—O}}|\phantom{\text{CFCF}_2} \\ \phantom{\text{HOCH}_2\text{CH(OH)CH}_2\text{OCH}_2\text{—R2—O}}\text{CF}_2\text{OCF}_2 \\ \phantom{\text{HOCH}_2\text{CH(OH)CH}_2\text{OCH}_2\text{—R2—O}}|\phantom{\text{CFCF}_2} \\ \text{HOCH}_2\text{CH(OH)CH}_2\text{OCH}_2\text{—R2—OCFCF}_2\text{O—R3—CH}_2\text{OCH}_2\text{CH(OH)CH}_2\text{OH} \end{array} \quad (6)$$

[Chem. 8]

—CF$_2$(OCF$_2$CF$_2$)$_p$— (a)

[Chem. 9]

—(CF$_2$CF$_2$O)$_q$CF$_2$— (b)

[Chem. 10]

—CF$_2$(OCF$_2$CF$_2$)$_r$—(OCF$_2$)$_s$—OCF$_2$— (c)

[Chem. 11]

—(CF$_2$O)$_t$—(CF$_2$CF$_2$O)$_u$—(CF$_2$O)$_v$—CF$_2$— (d)

[Chem. 12]

—(CF$_2$CF$_2$CF$_2$O)$_w$—CF$_2$CF$_2$— (e)

[Chem. 13]

—(CF$_2$CF(CF$_3$)O)$_x$—CF$_2$— (f)

[Chem. 14]

—CF$_2$CF$_2$(OCF$_2$CF$_2$CF$_2$)$_y$OCF$_2$CF$_2$— (g)

[Chem. 15]

—CF$_2$CF$_2$CF$_2$O(CF$_2$CF$_2$CF$_2$CF$_2$O)$_z$CF$_2$CF$_2$CF$_2$— (h)

2. The lubricant for a magnetic recording medium according to claim 1,
wherein the organic compound in the general formula (i) is an organic compound in the following general formula (ii).

[Chem. 16]

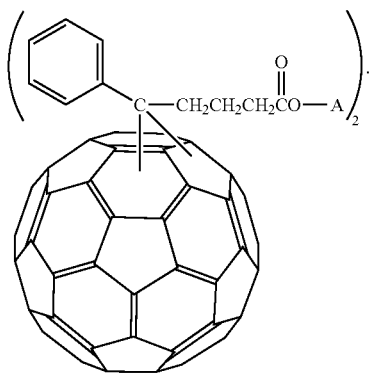

(ii)

3. The lubricant for a magnetic recording medium according to claim 1,
wherein the organic compound having the fullerene skeleton is an organic compound in the following general formula (iii), and an average molecular weight of the organic compound is in a range of 3000 to 7000,
wherein R2 is a perfluoro ether group in the general formulas (a) to (h), and p, q, r, s, t, u, v, w, x, y, and z of the general formulas (a) to (h) are integers of 1 to 100.

[Chem. 17]

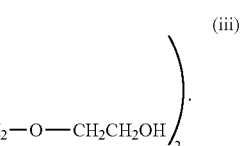

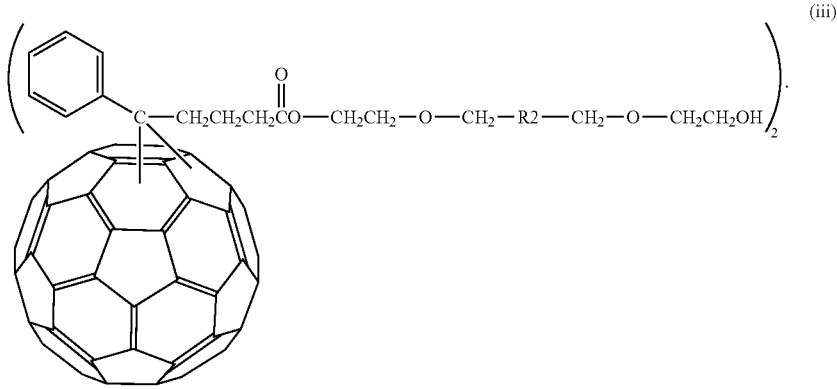

(iii)

4. A magnetic recording medium, comprising:

at least a magnetic layer, a protective layer including carbon, or carbon and hydrogen, and a lubricant layer including the lubricant for a magnetic recording medium according to claim 1, on a non-magnetic substrate, in this order.

5. A manufacturing method of a magnetic recording medium, comprising:

preparing a base including at least a magnetic layer and a protective layer on a non-magnetic substrate in this order; and forming a lubricant layer on the protective layer by dipping the base in a solution for forming a lubricant layer contained in a dipping tank, and then by pulling up the base from the dipping tank at a constant rate, wherein the solution for forming a lubricant layer includes an organic compound having a fullerene skeleton, and a fluorine-based solvent, the organic compound having the fullerene skeleton is an organic compound in the general formula (i) according to claim 1, and solubility of the organic compound having the fullerene skeleton with respect to the fluorine-based solvent is in a range of 0.001 mass % to 2 mass %.

6. A magnetic recording and reproducing device, comprising:

the magnetic recording medium according to claim 4;

a medium-driving unit driving the magnetic recording medium in a recording direction;

a magnetic head performing recording and reproducing of information with respect to the magnetic recording medium;

a head movement unit relatively moving the magnetic head with respect to the magnetic recording medium; and a recording and reproducing signal-processing unit performing processing of a recording and reproducing signal from the magnetic head.

* * * * *